Figure 1:
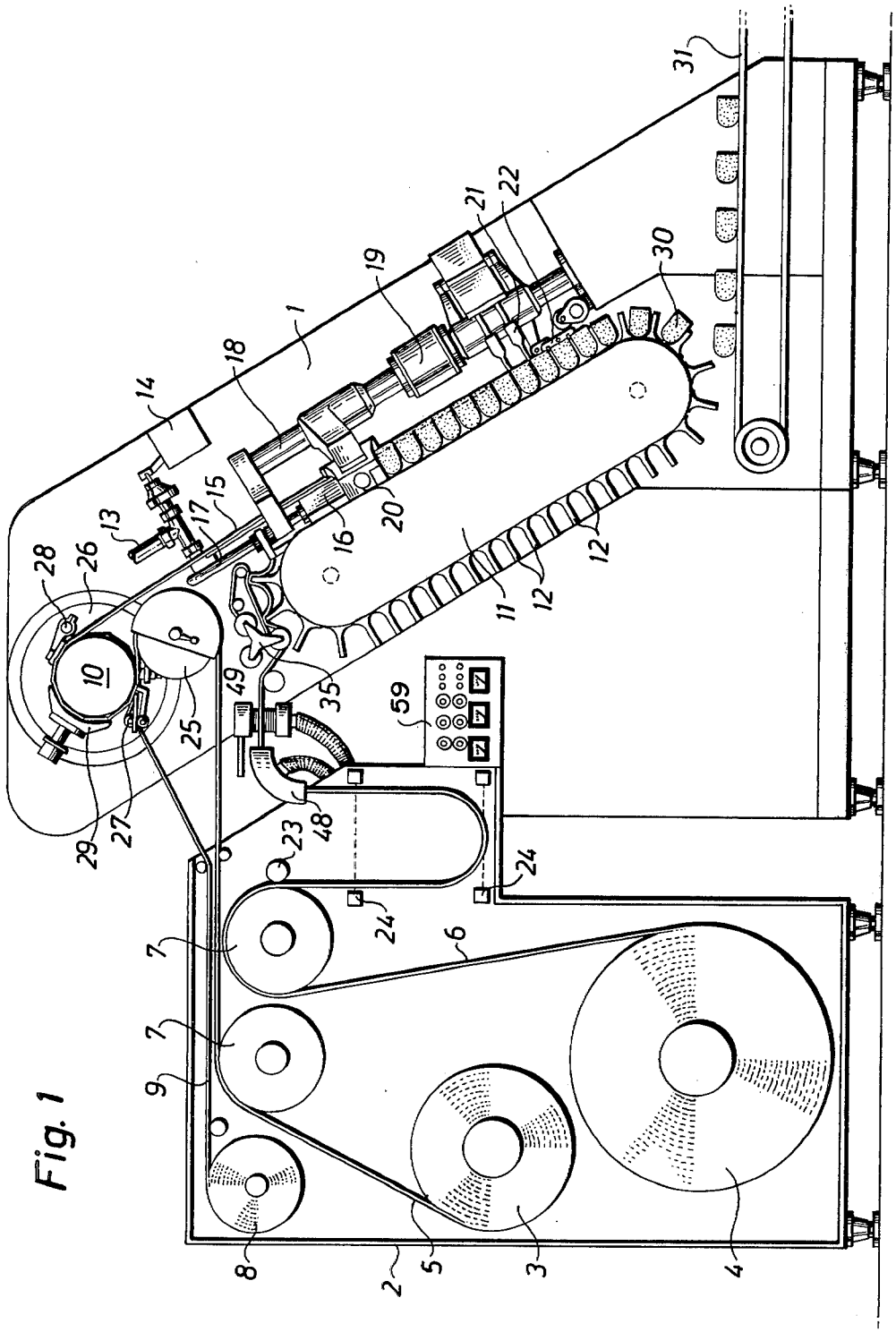

United States Patent [19]

Soukup et al.

[11] 4,017,247
[45] Apr. 12, 1977

[54] DEVICE FOR THE FORMING OF A PACKING MATERIAL WEB IN A PACKAGING MACHINE

[75] Inventors: Franz Soukup, Malmo; Tore Ingvar Larsson, Loddekopinge; Veine Bernt Borg, Kalmar, all of Sweden

[73] Assignee: Tetra Pak Developpement SA, Lausanne, Sweden

[22] Filed: Apr. 28, 1975

[21] Appl. No.: 572,091

[30] Foreign Application Priority Data

June 28, 1974 Sweden .............................. 7408565

[52] U.S. Cl. .............................. 425/360; 53/184 R; 425/362; 425/373; 425/383

[51] Int. Cl.² ......................................... B65B 47/02

[58] Field of Search ... 425/112, 122, 126, 127–128, 425/261, 335, 336, 360, 362, 369–370, 373, 383–384, 397; 53/184 R

[56] References Cited

UNITED STATES PATENTS

| | | | |
|---|---|---|---|
| 2,928,124 | 3/1960 | Hugger | 425/384 |
| 3,169,274 | 2/1965 | Columbo | 425/384 |
| 3,419,937 | 1/1969 | Bally | 425/384 |
| 3,422,492 | 1/1969 | Gorecki | 425/384 |
| 3,423,273 | 1/1969 | Mazur | 425/384 |
| 3,475,878 | 11/1969 | West, Jr. | 425/384 |
| 3,477,894 | 11/1969 | Graff et al. | 425/112 |
| 3,594,863 | 7/1971 | Erb | 425/384 |
| 3,594,865 | 7/1971 | Erb | 425/384 |
| 3,792,952 | 2/1974 | Hamon | 425/370 |

FOREIGN PATENTS OR APPLICATIONS 1,231,415 12/1966 Germany .......................... 425/112

Primary Examiner—Robert L. Spicer, Jr.
Assistant Examiner—John McQuade
Attorney, Agent, or Firm—Pierce, Scheffler & Parker

[57] ABSTRACT

The invention is concerned with a packing machine for forming a packaging material web, using a number of movable moulds joined together to form an endless track and means for pressing the web into the moulds.

8 Claims, 5 Drawing Figures

DEVICE FOR THE FORMING OF A PACKING MATERIAL WEB IN A PACKAGING MACHINE

The present invention relates to a device for the forming of a packing material web in a packaging machine which comprises a number of movable moulds which are joined together in a chain-like manner to form an endless track, with transverse walls outwardly projecting at an angle from the track and U-shaped recesses situated between the walls, which device is arranged rotatably so that in collaboration with the mould track it shapes the material web into a line connected U-shaped sections by pressing down of the continuously moving material web into the U-shaped recesses.

Packaging machines of the abovementioned type are known. In the known machine the shaping of the packing material web into a line of connected U-shaped sections takes place with the help of, on the one hand, an endless line of moulds arranged behind one another which are adapted to be moved at constant speed, and, on the other hand, a forming device, rotatable about an axis, with one or more curved forming surfaces, which are adapted to press the first material web down into the moulds to make the web adhere to the wall surfaces and the base of the moulds, and thereby give the web a shape which corresponds to the contours of the mould surfaces. The forming device is provided with two mutually identical curved forming surfaces situated at diametrically opposite sides about a central axis and adapted to carry out during operation a rotating as well as a reciprocating movement in register with the movement of the mould track.

The forming device described has a complicated pattern of movement and requires therefore for its operation a particularly complicated arrangement with cam disks and gear wheels.

It is an object of the present invention to provide a forming device for a machine of the abovementioned type, which device is particularly suitable for use with a chain of forming moulds wherein the recesses have a rounded base surface which without sharp corners extends into the side wall surfaces.

It is a further object of the present invention to provide a forming device of the abovementioned type which is of simple design and has a simple manner of operation by which it can be driven synchronously with the mould track by means of a single gear wheel.

Yet another object of the present invention is to provide a forming device of the abovementioned type, which device is suitable for the forming of material webs of relatively rigid plastic material e.g. a packing material consisting of a foamed plastic web with layers of homogeneous plastic material disposed on both sides.

These and other objects have been achieved in accordance with the invention by providing a forming device of the type described in the introduction with at least two axially symmetrical elements, the axes of rotation of which are parallel with each other and with the axis of rotation of the forming device and are situated at equal distances from the axis of rotation of the forming device. The preferred embodiments of the forming device in accordance with the invention have been given the characteristics described hereinafter.

In the following the invention will be described in detail with reference to the enclosed diagrammatic drawings.

Figure 2:
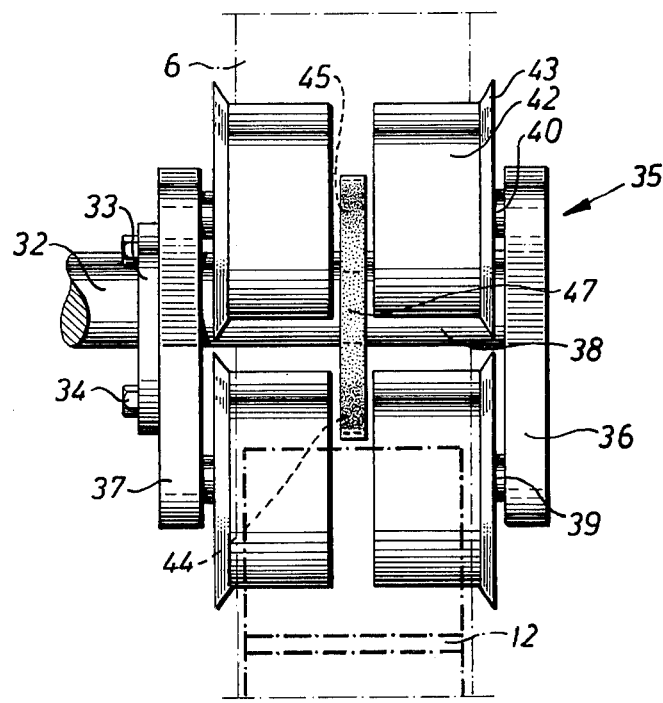
Figure 3:
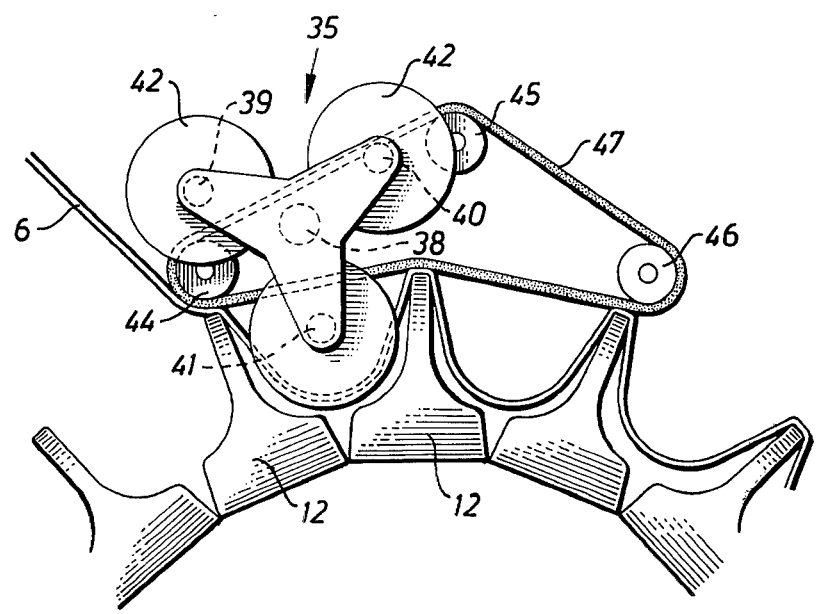
Figure 4:
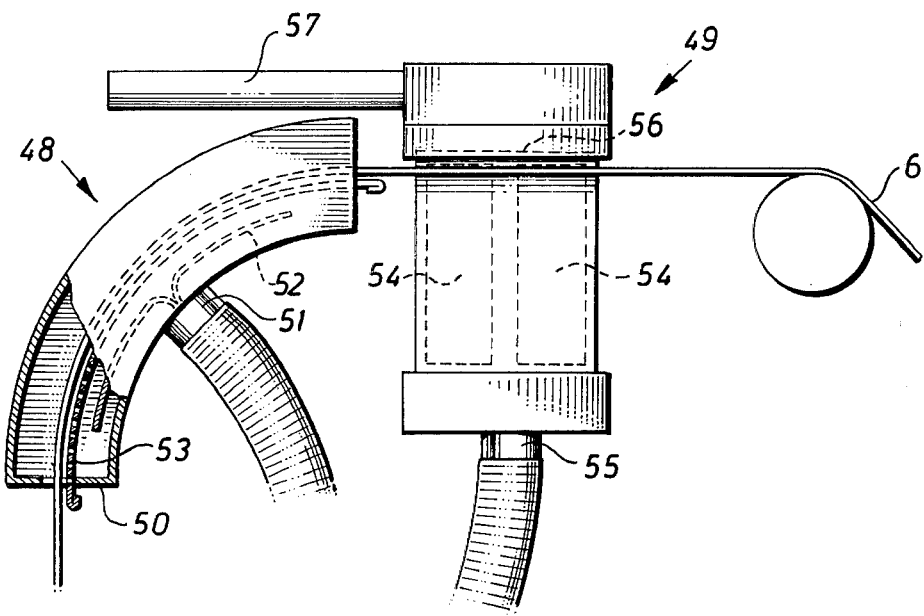
Figure 5:
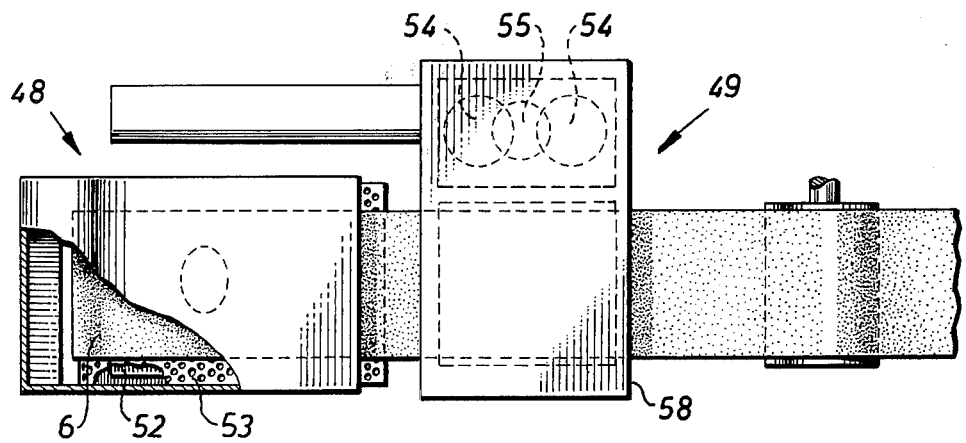

FIG. 1 shows a packaging machine with a forming device in accordance with the invention, FIG. 2 shows the forming device in accordance with the invention in front elevation, FIG. 3 shows the forming device in accordance with the invention in the side elevation, FIG. 4 shows a heating unit in accordance with the invention in side elevation and FIG. 5 is a plan view of the heating unit in accordance with FIG. 4.

In FIG. 1 there is shown a front elevational view of a packaging machine with a forming device in accordance with the invention, the frame for the packaging machine proper being designated 1 and a packing material section being designated 2.

The packaging material section 2 comprises a number of so-called roller stands comprising magazine rolls of packing material. The magazine rolls 3 and 4 carry packing material webs, which for example may be constituted of extruded foamed plastic webs of polystyrene material which is covered on both sides with layers of homogeneous polystyrene. The packing material webs 5 and 6 are rolled off the magazine rolls 3 and 4 and are guided over the guide rollers 7. The magazine roll 8 carries strip material 9 of homogeneous plastic material which is intended to be used as a removable cover material over the opening of the completed packages.

The packaging machine proper consists as mentioned above of a frame 1 which supports a rotating drum 10 over which the packing material web 5 is guided and on which working operations are carried out at stations along the periphery of the drum. The packaging machine moreover comprises an arrangement 11 for the forming of the web 6. The arrangement 11 comprises moveable moulds 12 which are attached to form an endless chain, which, in the figure shown, moves in clockwise direction. In FIG. 1, furthermore, a feed line for filling material is designated 13, a control valve for controlling the quantity of filling material fed is designated 14 and a filling pipe 15. A heating device is designated 16 and a supply line for air 17. A reciprocating column is designated 18 and bearings, which are fixed permanently on the machine frame 1 and which serve for guiding the column are marked 19. The column 18 carries a folding device 20, a sealing device 21 and a clipping device 22 which all move together with the column in the reciprocating movement of the latter, which movement is adapted so that the column moves synchronously with the moulds 12 in its downwards movement, whilst the upward return movement is faster.

The packaging machine operates in the following manner.

From the magazine roll 4 a first packing material web 6 is rolled off and is provided with crease lines, which web is guided over a guide roller 7. The packaging material web 6 is rolled off with the help of a driving roller 23 which is controlled by means of a photo-cell device comprising two photo-cell arrangements 24. If too much packing material web 6 has been rolled off by means of the driving roller 23, the loop of packing material web formed will intercept the bottom photo-cell device 24, as a result of which a pulse is produced and the driving mechanism for the driving roller 23 is stopped (FIG. 1). This means that the advance of packing material is interrupted, as a result of which the loop of packing material is reduced. When the loop has become so small that the top of photo-cell device 24 is clear, the advance of packing material is started again with the help of the driving roller 23. The packing material web 6 is brought into contact with the moulds 12 which are arranged on an endless chain which moves at constant speed in a closed track. With the help of a forming device 35 in accordance with the invention, the packing material web 6 (possibly after heating by means of a heating unit 48, 49, which will be described later) is made to conform with the moulds 12, whereby the web 6 is formed into an endless line of U-shaped parts, which, with the help of the forming arrangement 11, are made to move at constant speed substantially downwardly.

The second packing material web 5 is rolled off its magazine roll 3 and is guided over a guide roller 25 and is fed to the feed drum 10. The latter, as mentioned before, has a number of sections or forming surfaces, each of which has a length which substantially corresponds to the distance between two consecutive moulds 12 on the forming arrangement 11. The feed drum 10 rotates at constant speed whilst an outer rim or oscillator plate 26 has a reciprocating driving movement around the drum 10. The plate 26 carries working elements, such as a hollow punch and cover strip applicator 27, a forming and clipping element 28 and a heating device 29. When the web 5, with the help of the feed drum 10, is conducted past the working stations 27–29, a pouring hole, in punched in the web a cover strip is placed over the pouring hole, the web is subjected to heating and possible thermoforming, and the edge zones of the web are cut mainly at right angles to the longitudinal direction of the web. From the magazine roll 8 a strip 9 of homogeneous plastic material is rolled off, which strip is fitted by means of the cover strip applicator 27 over the pouring hole made in the web 5, and is fixed to the web 5 so that the pouring hole is covered. Moreover, the front part of the strip 9 is clipped off with the help of the cover strip applicator 27 so that the cover strip part applied over the pouring hole is severed from the remainder of the strip 9. The edge zones of the web 5 have been transformed by cutting to form consecutively arranged tongues projecting laterally, whose length substantially corresponds to the height of the moulds 12. The web 5 is advanced with the help of the feed drum 10 at a rate which is the same as the speed of movement of the moulds 12, the web being moved forwards until its longitudinal central portion is placed over the tops of the moulds 12, whilst the edge zones of the web, cut to form tongues or lugs, project laterally outside the moulds 12. The web 5 is moved then forward in such a manner that the slots or cuts in the web are placed just opposite the transverse partition walls of the moulds 12.

Whilst the web 5 is advanced synchronously with the movement of the moulds 12 with the help of the feed drum 10, the column 18 occupies an upper end position and commences a downwards movement, which is also synchronous with the movement of the moulds 12. The column 18 carries a heating device 16 which can be connected via a pipeline 17 to an air source, and with the help of the heating device hot air is blown against the underside of the edge zones or lugs of the web 5, as a result of which the plastic material is softened and activated for sealing, and at the same time the side edges of the web 6 are also heated, by hot air blown against the edges of the web exposed at the side edges of the moulds.

While heating of the zones on the webs 5 and 6, which are intended to be sealed to one another, is performed by means of the heating device 16, the lugs or tongues on the web 5 heated during the earlier working stage of the column 18, are folded down by means of a folding device 20 to lie against the edge zones of the web 6 situated outside the sides of the moulds 12 which edge zones have also been heated previously, so that the portions of the webs placed upon one another fuse together to form a mechanically durable and effective seal, which is stabilized, in that the folding device 20 cools down the sealing area during the time it is engaged with the folded down portions of the web 5. When the webs 5 and 6 have been joined to one another by means of the seals in the manner described above, the filling material is supplied through the filling pipe 15, which is arranged underneath the central portion of the web 5 but above the tops of the moulds 12, and the compartment-like spaces formed in the web 6 underneath the web 5 are filled with the intended filling material. The said spaces are sealed by means of the sealing device 21 to form closed units, by transversely sealing the web 5 to the central portions of the web 6 which are situated above the tops of the transverse walls of the moulds 12. The sealing device 21 is also attached to the column 18 and follows the column in its reciprocating movement, which means that the sealing takes place whilst the column moves downwards synchronously with the moulds. The closed units formed are separated finally from one another with the help of the clipping device 22, which severs the units from one another by a cut through the transverse sealing zones which have been produced by the sealing device 21.

The filled and closed packing units 30 are transferred subsequently at the lower end of the mould band to a conveyor 31 to be carried off and packed into cases or the like.

The packaging machine may be operated from a control and operating panel 59, comprising the necessary operating elements together with instruments showing the temperature in the different heating zones etc.

After this description of a packaging machine with the forming device in accordance with the invention, the forming device itself (FIGS. 2, 3) will be described in greater detail.

The forming device 35 in accordance with the invention is located above the upper turning point of the endless chain formed by the movable moulds 12. The forming device 35 is supported by an axle 32 rotatably mounted in the machine frame 1, parallel with the axis of the guide wheels over which runs the mould chain. The axle 32 is provided at its outer end with a flange 33 to which is attached the forming device 35 by means of screws 34. The forming device 35 comprises a carrier element cast in aluminum which has an axle 38, forming a coaxial continuation of the axle 32 which carries at each end a flange-like element 36, 37 provided with arms. The flange elements 36, 37 are mutually parallel and each of them is provided with three equally spaced arms projecting radially therefrom. Each arm of each flange element has at its outer end a fixed axle 39–41 which extends toward the opposite flange. The axles 39–41 are parallel with the central main axle 38 of the forming device 35 and are situated at the same distance from the central main axle 38 of the forming device 35 and are arranged equidistant from each other. The projecting arms of both flange devices 36, 37 are located opposite one another so that each axle 39–41 on the one flange 36 extends coaxially of the opposed axle on the opposite flange element 37. All axles 39–41 are equally long and have a the length so that between the ends of two opposed axles forming a pair face each other to provide, an interspace with a width of about 25 mm. Each axle 39–41 carries an axially symmetrical cylindrical element or roll 42 which at its outer end is provided with a flange 43. The rolls 42 are freely rotatable on the respective axles 39–41, and are disposed so that the flanges 43 are adjacent the flangelike element 36 or 37 carrying the respective rolls. The rolls have a length substantially corresponding to the axles 39–41, so that an interspace is formed between the ends of opposed the rolls facing one another. Each pair of rolls 42 thus forms a cylindrical surface limited by the opposed flanges 43 and interrupted by the interspace centrally between the opposed rolls 42. The width of this cylindrical surface conforms to the width of the material web 6, and the material web is guided during operation between the flanges 43.

In the interspace between the end faces of the opposed pairs of rolls 42 a pressure device is arranged which comprises three guide pulleys 44–46, over which runs an endless belt 47. As can be seen from FIG. 3, two of the guide pulleys 44 and 46 are arranged adjacent the upper edges of the moulds 12, whilst the third guide pulley 45, which is preferably subjected to a belt tensioning device (not shown) is at a greater distance from the upper edge surfaces of the moulds 12. The lower portions of the belt 47 running between the guide pulleys 44 and 46 is substantial in contact, depending on the position of the mould chain, with two or three upper edge surfaces of the moulds 12. The variations in the path of this lower belt portion between the guide pulleys 44 and 46 which arise are absorbed by the pulley 45 provided with a belt tensioning device, so that the bottom portion of the belt 47 will be pressed positively against the moulds 12. The pressure device operates completely independently of the forming device 35 and the belt 47 is moved by the moulds 12 as they pass by.

When the packaging machine operates, the lower packing material web 6 runs to the upper end of the forming arrangement 11 where it is fed in and is shaped according to the recesses of the moulds 12 by the pairs of rolls 42. The packing material web 6 is made to conform with the moulds 12 during their movement past the forming device 35, which is driven synchronously with the moulds 12 (in anti-clockwise direction in FIG. 3). The forming is done by each pair of rolls 42 during the rotation of the forming device 35 successively pressing down a succeeding portion of the packing material web 6 into a succeeding recess in the mould chain. The portion of the packing material web 6 already formed in a preceding mould is held in place at the upper edge surface of the transverse walls of the moulds 12 by the belt 47 of the pressure device, so that the packing material 6 without slipping follows along with the advance of the moulds and succeeding material is constantly rolled off the magazine roll 4. Each pair of rolls on the forming device presses the material web 6 down into the recess of the moulds 12 until the particular pair of rolls is in its lowest position. At the same time as this happens, the portion of the belt 47 of the pressure device situated underneath the wheel 44, will press the part of the packing material web 6 against the top of the transverse wall of the mould 12 so that the web 6 remains in its pressed down position, during the continued advance of the moulds 12, in spite of the particular pair of rolls of the forming device, during the continued rotation of the forming device 35, being lifted up again, out of the recess between the moulds. During the continued advance of the mould chain along the upper, curved track portion of the forming arrangement 11, the material web already formed is thus prevented from leaving the recesses in the moulds by the belt 47 of the pressure device. When the moulds 12 with the formed web 6 move in the downwards direction along the righthand, straight portion of the forming arrangement 11 the upper parts of the moulds 12 approach one another so that the space between them diminishes, as a result of which the formed web 6 is retained in the recesses without any possibility of slipping out.

The driving of the forming device 35 synchronously with the mould chain can be achieved for example by a gear wheel or the like arranged between the axle 32 and the axle driving the moulds 12.

The distance between the axle 32 and the mould track is adapted so that the portion of the packing material web pressed down into the recesses in the mould chain completely adheres to the recesses when the mould chain is displaced along the straight part of the forming arrangement 11.

The packing material web 6 used can be provided with transverse crease lines so as to facilitate the folding over the tops of the transverse walls of the moulds 12. It has been found that if it is merely ensured on starting the machine that the first two parallel crease lines are in the correct position over the transverse wall of the mould, the succeeding crease lines will, owing to the rigidity of the material, bring the material into register with the mould chain, so that during the continued operation the folding of the web over the tops of the transverse walls of the moulds 12 takes place along the crease lines. Owing to this, the material lying in between the creases, which does not have crease lines, will automatically be used for the curved soft bends at the bottom of the U-shaped recesses in the mould chain.

When the forming device described is used for the forming of material webs of rigid plastic material which have a tendency to crack during forming (e.g. a material which consists of a foamed plastic web with webs of homogeneous plastic material situated on both sides) it may be appropriate to heat the material web so as to eliminate the risk of cracking and formation of wrinkles during the forming. The heating must be particularly strong in the area where the strongest bending takes place. This heating takes place directly before the forming and the forming device is complemented therefore by a web heating unit 48, 49 which will be described in detail in the following with special reference to FIGS. 4 and 5.

The web heating unit shown in the drawing comprises two main parts, namely a first heating arrangement or preheating arrangement 48 and a second heating arrangement or intensive heating arrangement 49. The arrangements are so placed in series that the material web passes both during operation.

The heating arrangement 48 comprises an elongated, curved casing 50, through which the material web 6 passes in longitudinal direction. The material web enters the casing 50 through a slot provided in one end face of the casing, and exits through a slot arranged in a corresponding manner in the opposite end face of the casing 50. The casing 50 is provided in addition to the slots with a further opening 51, which is arranged substantially halfway between the two end faces of the casing and is intended for the feeding in of hot air. Inside the opening 51 there is a spreader element 52 with the object of distributing the air blown in. Finally a plate 53 is present in the casing 50 for the guiding of the material web 6, which plate is perforated so as to allow air to flow therethrough.

Directly following the first heating arrangement 48 is the second heating arrangement or intensive heating arrangement 49. This comprises a casing 58 having an inverted L shape, the short leg of which is situated directly above the material web 6 and the long leg of which is situated at the side of the material web. At the bottom end of the long leg there is an air feed opening 55 to which is connected an air tube. Inside the casing are two electric heating cartridges 54. At the underside of the short leg of the casing 58 is an opening covered by a grating 56, which preferably has a width corresponding to the material web. The whole intensive heating arrangement 49 is suspended pivotably about an axle 57 and can be swung away from the material web with the help of a pneumatic cylinder, not shown on the drawing.

During operation the material web 6 runs in through the slot at the starting end of the preheating arrangement 48 and is guided through the preheating arrangement towards the opposite exit slot with the help of the guide plate 53. At the same time, air is blown in at a temperature within the range of 50° to 100° C, preferably about 70° C through the opening 51, which air is distributed by the spreader device and the perforated guide plate 53, so that the material web passing through is uniformly heated. The path which the material web 6 follows through the casing 50 of the preheating arrangement has a length which substantially corresponds to the web length required for three U-shaped sections, which thus ensures that the material web 6 will be uniformly heated during the passage through the preheating arrangement in spite of the web being advanced by the forming device 35 at an uneven speed.

When the material web 6 thus heated leaves the preheating arrangement 48 it enters directly into the intensive heating arrangement 49 and is heated by the same. Air is blown in continuously through the opening 55 at the bottom of the intensive heating arrangement 49 (appropriately with the help of the same fan which provides the preheating arrangement 48 with air), which air flows past and is heated up by the two electric cartridges 54. These electric cartridges are controlled for example by means of a thermostat in such a manner, that the air flowing past is heated to approx. 240° C. Subsequently the air thus heated flows to the short leg of the L-shaped casing 58, whereupon it flows out through the opening covered by a grating 56 arranged on the underside of the leg. This opening is situated directly above the material web 6. The width of the opening corresponds substantially to or slightly exceeds the width of the packing material web, whilst the length of the opening corresponds to or slightly exceeds the length of web which is required to form a base portion of a U-shaped section. Owing to the alternatively rapid and slow advance of the material web 6 caused by the forming device 35 a certain length of the packing material web will pass the intensive heating arrangement 49 relatively rapidly, whereupon the movement of the material web virtually stops and the portion of the web situated then underneath the discharge opening of the intensive heating arrangement 49 is strongly heated, whereafter the web is once more advanced reapidly and so on. The heating unit is placed at such a distance from the forming device 35 and the mould chain that the portions of the web which are strongly heated coincide with the web portions, which will form the curved parts at the base of the U-shaped recesses. The portions of the web lying in between, which are on the whole not heated by the intensive heating arrangement, are provided with crease lines and correspond to the portions of the web which fold over the tops of the transverse walls of the moulds. Owing to the comparatively great length of the preheating part 48, the uneven progress of the material web 6 will not preheat certain zones of the web compared to other zones, but will leave the preheating part 48 at a comparatively even temperature along the whole of its length.

Warm air can be supplied to the preheating part 48 and to the intensive heating part 49 from a common fan and the air can, after distribution to the respective heating sections be further heated to the desired degree with the help of thermostatically controlled electric cartridges.

The air heating temperatures indicated are usually in the range of 50°–100° C and preferably 70° C for the preheating part 48 and 240° C for the intensive heating part 49, although these are adapted, of course, to the type of material used.

To prevent the intensive heating section 49 from heating the web 6 in a damaging manner on the occasion of an accidental stoppage or the like, the heating unit 49 is mounted so that it may be pivoted about an axle 57 and swung away from the material, for example by means of a pneumatic cylinder, when the advance of the web is interrupted or stops.

By means of the heating unit and forming device in accordance with the invention the forming of material webs of relatively rigid plastic material, e.g. a packing material consisting of a foamed plastic web covered on both sides with webs of homogeneous plastic material is made possible, without undesirable cracks, wrinkles or fractures occurring.

We claim:

1. In apparatus for forming a web of packaging material into a series of interconnected packages in which a plurality of U-shaped mould cavities are interconnected to form an endless chain having transverse walls separating each mould cavity and means adjacent said endless chain for feeding the web to the endless chain of mould cavities and means operatively associated with said endless chain for moving the endless chain in a closed continuous path about parallel axes, the improvement comprising a device for pressing the web into each successive mould cavity as it passes a package shaping station, said device comprising at least two rotatable shaping elements, each shaping element comprising a pair of spaced coaxial roller elements, means mounting each pair of coaxial roller elements for free rotation about an axis parallel to the parallel axes of said endless chain, and angularly equidistant from each other pair, means operatively associated with said shaping elements for rotating said shaping elements synchronously with the movement of the endless chain about a common fixed axis equidistant from the axes of each pair of coaxial roller elements and adjacent said endless chain so that each of said at least two shaping elements successively enter into and are withdrawn from successive mould cavities during movement of said endless chain and during synchronous rotation of said shaping elements about the common axis to press the web into successive mould cavities and a pressure device comprising an endless belt disposed between the spaced coaxial roller elements of each pair, one portion of said belt being located adjacent the transverse walls of the U-shaped mould cavities passing the package shaping station whereby the endless belt engages and presses the web of packaging material against the top of the transverse walls while passing the shaping station to prevent longitudinal slippage of the web after having been pressed into a preceeding mould cavity by one of said shaping elements.

2. In apparatus as claimed in claim 1 the improvement wherein said web pressing device comprises three shaping elements.

3. In apparatus as claimed in claim 1 the improvement wherein each of said roller elements is provided with a flange about the outer end thereof for guiding said web.

4. In apparatus as claimed in claim 1 the improvement further comprising at least two rotatable axles supporting said endless belt of the pressure device.

5. In apparatus as claimed in claim 1 the improvement wherein said endless belt is driven by frictional engagement with the web of packaging material disposed on the top of the transverse walls of the mould cavities.

6. In apparatus as claimed in claim 1 the improvement further comprising means preceding said endless chain for heating said web prior to being shaped at the package shaping station.

7. In apparatus as claimed in claim 6 the improvement wherein the web comprises a relatively rigid foamed plastic material and further comprising a first heating means disposed before the shaping station for heating substantially all of the web to a low temperature for rendering said web flexible and a second heating means located between said first heating means and the shaping station for heating spaced transverse areas of the web to a higher temperature to permit said spaced areas to be pressed into the successive mould cavities by said shaping elements without cracking or wrinkling.

8. In apparatus as claimed in claim 7 the improvement wherein said first heating means is heated to a temperature between about 50° C. and 100° C. and wherein said second heating means is heated to a temperature of about 240° C.

\* \* \* \* \*